US010911588B2

(12) United States Patent
Lei (10) Patent No.: US 10,911,588 B2
(45) Date of Patent: Feb. 2, 2021

(54) MOBILE TERMINAL EXTERNAL ASSEMBLY AND MOBILE TERMINAL PROTECTION SLEEVE

(71) Applicant: SHENZHEN ROMOSS TECHNOLOGY CO., LTD, Shenzhen (CN)

(72) Inventor: Canhuo Lei, Shenzhen (CN)

(73) Assignee: SHENZHEN ROMOSS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/489,246

(22) PCT Filed: Mar. 1, 2017

(86) PCT No.: PCT/CN2017/075353
§ 371 (c)(1),
(2) Date: Aug. 27, 2019

(87) PCT Pub. No.: WO2018/152860
PCT Pub. Date: Aug. 30, 2018

(65) Prior Publication Data
US 2020/0068057 A1   Feb. 27, 2020

(30) Foreign Application Priority Data

Feb. 27, 2017   (CN) .......................... 2017 1 0109642

(51) Int. Cl.
*H04M 1/21* (2006.01)
*H04B 1/3888* (2015.01)
(52) U.S. Cl.
CPC ............ *H04M 1/21* (2013.01); *H04B 1/3888* (2013.01)

(58) Field of Classification Search
CPC combination set(s) only.
See application file for complete search history.

(56) References Cited

U.S. PATENT DOCUMENTS 8,706,176 B1 * 4/2014 Jia ...................... H04M 1/185
206/305
8,891,800 B1   11/2014 Shaffer
(Continued)

FOREIGN PATENT DOCUMENTS

CN   102856608   1/2013
CN   203521712   4/2014
(Continued)

*Primary Examiner* — Ganiyu A Hanidu (57) ABSTRACT

A mobile terminal protection sleeve (100), comprising a sleeve body (120), communication terminals (140), an internal lead, a flexible data line (160), and a flexible connector (180). The sleeve body (120) can surround the edge of the mobile terminal, and is provided with a plurality of terminal accommodating holes and an opening, and the opening corresponds to the communication interface of the mobile terminal. A plurality of communication terminals (140) is provided for communicationally connected to an external device (200). The plurality of communication terminals (140) are embedded in the plurality of terminal accommodating holes in one-to-one correspondence. The internal lead is wrapped in the sleeve body (120), and one end of the internal lead is electrically connected with the communication terminals (140). One end of the flexible data line (160) is connected with the sleeve body (120), and the other end of the internal lead is electrically connected with the flexible data line (160). The flexible connector (180) is connected with the other end of the flexible data line (160), and the flexible connector (180) can be inserted in the opening, and is in a butt joint with the communication interface.

15 Claims, 7 Drawing Sheets

(56) References Cited

U.S. PATENT DOCUMENTS

| | | | |
|---|---|---|---|
| 2009/0128092 A1 | 5/2009 | Woud | |
| 2009/0154095 A1 | 6/2009 | Woud | |
| 2009/0160400 A1 | 6/2009 | Woud | |
| 2013/0058023 A1* | 3/2013 | Supran | G06F 1/1632 361/679.01 |
| 2014/0184139 A1* | 7/2014 | Wen | H02J 7/0044 320/103 |
| 2015/0245125 A1 | 8/2015 | Shaffer | |
| 2015/0245126 A1* | 8/2015 | Shaffer | H04R 1/1025 381/74 |
| 2015/0301561 A1* | 10/2015 | Carnevali | G06F 1/1628 455/575.8 |

FOREIGN PATENT DOCUMENTS

| | | | | |
|---|---|---|---|---|
| CN | 203524035 | | 4/2014 | |
| CN | 204030182 | | 12/2014 | |
| CN | 205901864 | * | 1/2017 | H04M 1/18 |
| JP | 3170660 | | 9/2011 | |
| JP | 3181870 | | 2/2013 | |
| WO | 2009059181 | | 5/2009 | |
| WO | 2015126572 | | 6/2015 | |
| WO | 2015126611 | | 6/2015 | |

* cited by examiner

MOBILE TERMINAL EXTERNAL ASSEMBLY AND MOBILE TERMINAL PROTECTION SLEEVE

TECHNICAL FIELD

The present disclosure relates to the technical field of communication device, and in particular to a mobile terminal peripheral assembly and a mobile terminal protective case.

BACKGROUND

With the continuous development of the mobile phone, the mobile phone using ways are more diversified. The mobile phone often needs to interconnect with peripheral devices, such as external projector, audio device, and so on, so as to realize more abundant functions.

The mobile phone and the peripheral device need to establish the communication and the traditional way is through a data wire connection. However, the conventional data wire connection method is inconvenient to operate.

SUMMARY

Accordingly, it is necessary to provide a mobile terminal peripheral assembly which is conveniently connected to a peripheral device and a mobile terminal protective case thereof.

A mobile terminal protective case is provided for protecting a mobile terminal and connecting a peripheral device, the protective case includes:

a case body capable of surrounding an edge of the mobile terminal, the case body having an opening and a plurality of terminal accommodating holes, the opening corresponding to a communication interface portion of the mobile terminal;

a plurality of communication terminals configured to be communicated with the peripheral device, each communication terminal being embedded in a corresponding terminal accommodating hole;

an internal wire disposed inside the case body, one end of the internal wire being electrically coupled to the communication terminal;

a flexible data cable, one end of the flexible data cable being connected to the case body, and the other end of the internal wire being electrically coupled to the flexible data cable; and a flexible connector connected to the other end of the flexible data cable, the flexible connector being capable of being inserted in the opening and connected to the communication interface portion.

A mobile terminal peripheral assembly is provided for mounting on a mobile terminal, the mobile terminal peripheral assembly includes:

a protective case, and a peripheral device, the peripheral device including a device body and a docking terminal disposed on the device body, the number of the docking terminal being plural, a plurality of docking terminals being electrically and communicatively coupled to the plurality of communication terminals in one-to-one correspondence.

In the mobile terminal peripheral assembly and the mobile terminal protective case, the protective case is sleeved on the mobile terminal. The flexible connector is inserted in the communication interface portion of the mobile terminal, such that the communication terminal, the internal wire, the flexible data cable, and the flexible connector can form a communication circuit. When it is required to connect the peripheral device, the communication terminal is directly engaged to the docking terminal of the peripheral device, so that the communication between the peripheral device and the mobile terminal can be realized, and the operation is convenient. Since the case body surrounds the edge of the mobile terminal, it can protect the mobile terminal during collision or fall. The flexible connector inserted in the communication interface portion can serve as a plugging member to prevent dust from entering the communication interface portion, thereby further protecting the mobile terminal. Since the flexible data cable and the flexible connector are both flexible structures, they are not easily damaged after a long-term connection with the mobile terminal. Meanwhile, since the whole structure of the protective case is simple and light, the protective case can be always sleeved on the mobile terminal to protect the mobile terminal without removing the protective case frequently. When it is required to connect the peripheral device, the protective case can be directly and conveniently connected.

BRIEF DESCRIPTION OF THE DRAWINGS

In order to more clearly illustrate embodiments of the present disclosures or solutions in the prior art, the drawings required to be used in the description of the embodiments or the prior art will be briefly described below. Apparently, the drawings in the following description are merely some embodiments of the present disclosure, and for those of ordinary skill in the art, the drawings of other embodiments can also be obtained from these drawings without any creative effort.

DETAILED DESCRIPTION OF THE EMBODIMENTS

In order to facilitate understanding of the present disclosure, a mobile terminal peripheral assembly and a mobile terminal protective case will be described more fully below with reference to the corresponding drawings. Preferred embodiments of the mobile terminal peripheral assembly and the mobile terminal protective case are shown in the drawings. However, the mobile terminal peripheral assembly and the mobile terminal protective case can be implemented in many different forms and are not limited to the embodiments described herein. On the contrary, the purpose of providing these embodiments is to make the disclosure contents of the mobile terminal peripheral assembly and the mobile terminal protective case more thorough and comprehensive.

Unless otherwise defined, all technical and scientific terms used herein have the same meaning as generally understood by those skilled in the art of the present disclosure. The terms used herein in the specification of the mobile terminal peripheral assembly and the mobile terminal protective case are for the purpose of describing specific embodiments and are not intended to limit the disclosure. As used herein, the term "and/or" includes any and all combinations of one or more related listed items.

Figure 1:
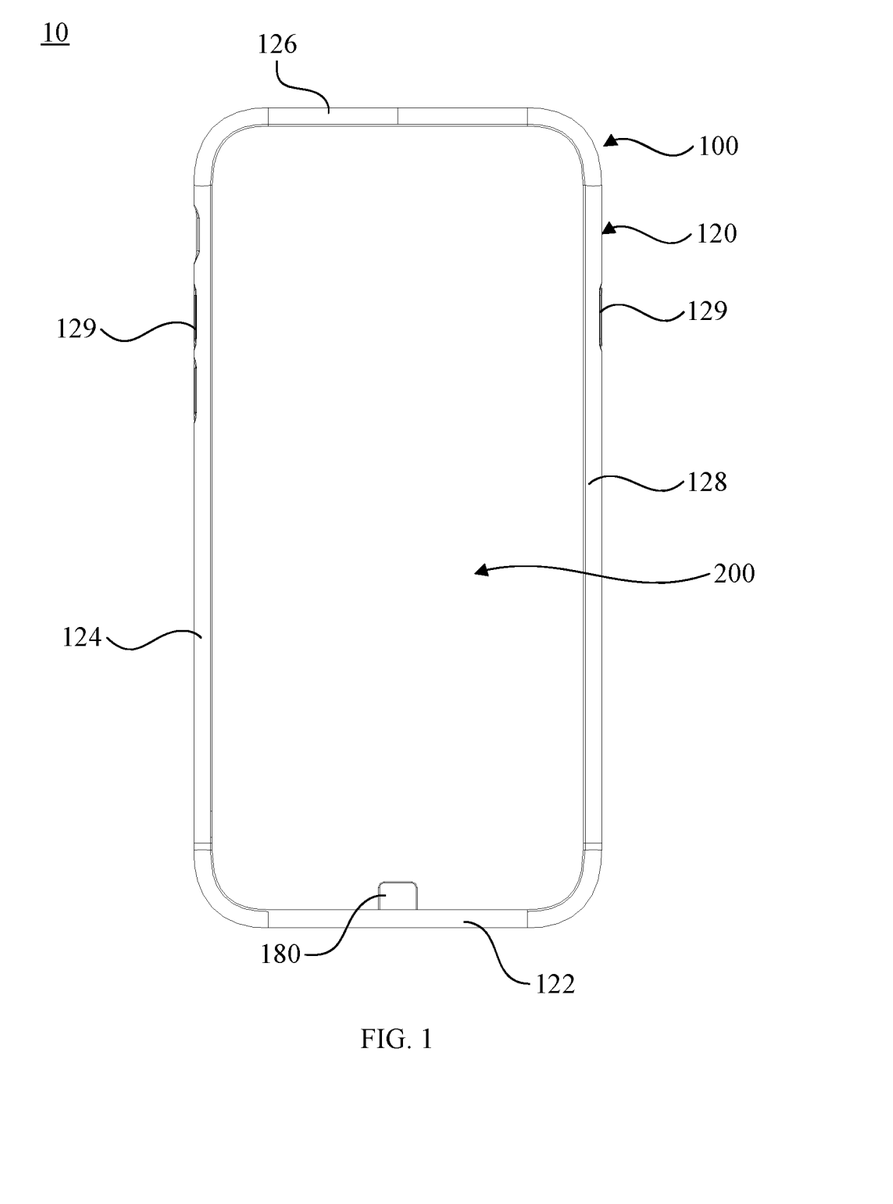
FIG. 1 is a front view of a mobile terminal peripheral assembly of an embodiment.
Figure 2:
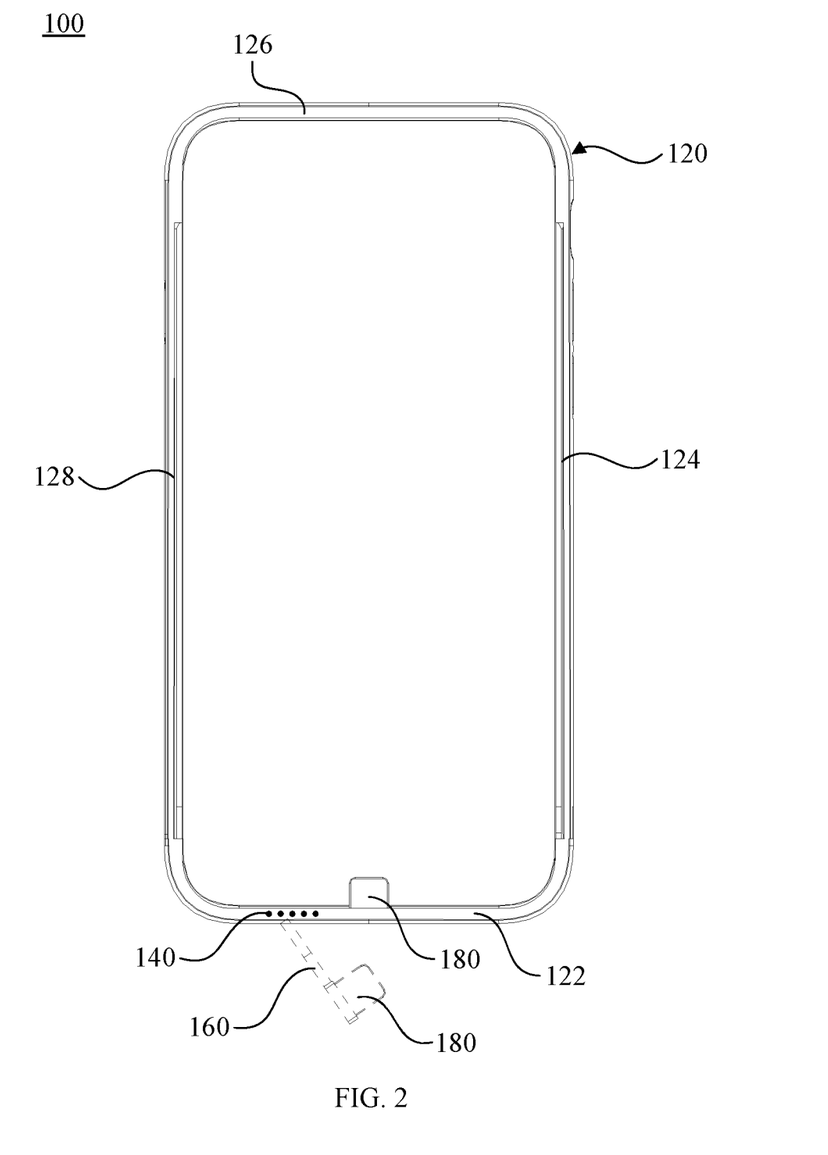
FIG. 2 is a rear view of a protective case of the mobile terminal peripheral assembly shown in FIG. 1.

As shown in FIG. 1 and FIG. 2, a mobile terminal peripheral assembly 10 according to one embodiment includes a mobile terminal protective case 100 and a peripheral device 200. The peripheral assembly 10 can be mounted on a mobile terminal to extend the functionality of the mobile terminal or charge the mobile terminal. The mobile terminal can be a mobile communication device, such as a mobile phone or a tablet computer. In the illustrated embodiment, the mobile terminal is a mobile phone.

Specifically, the mobile terminal protective case 100 is used for protecting the mobile terminal and connecting the peripheral device 200. The protective case 100 includes a case body 120, a communication terminal 140, an internal wire, a flexible data cable 160, and a flexible connector 180. The case body 120 can surround an edge of the mobile terminal, and is provided with a plurality of terminal accommodating holes and an opening. The opening corresponds to a communication interface portion of the mobile terminal.

Figure 3:
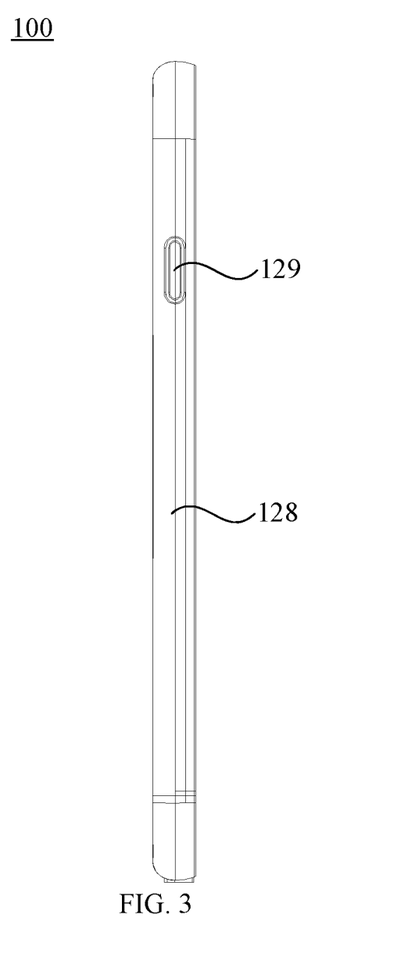
FIG. 3 is a right side view of the protective case of the mobile terminal peripheral assembly shown in FIG. 1.

Specifically, in one embodiment, the case body 120 is box-shaped and includes a first frame bar 122, a second frame bar 124, a third frame bar 126, and a fourth frame bar 128, which are connected end to end. The first frame bar 122 is arranged oppositely to the third frame bar 126, the second frame bar 124 is arranged oppositely to the fourth frame bar 128. Referring also to FIGS. 1 and 3, further, in one embodiment, the opening and the plurality of terminal accommodating holes can be located on the first frame bar 122. The second frame bar 124 and the fourth frame bar 128 are provided with a pressing key 129 mating with a function key of the mobile terminal. In other embodiments, the pressing key 129 can be provided only on the second frame bar 124 or the fourth frame bar 128, depending on the different positions of the function keys of the different mobile terminals.

Figure 4:
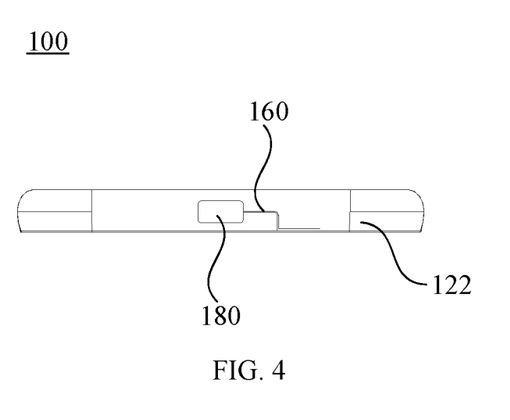
FIG. 4 is a bottom view of the protective case of the mobile terminal peripheral assembly shown in FIG. 1.

The plurality of the communication terminals 140 are used for communicating with the peripheral device 200. The plurality of communication terminals 140 are embedded into the plurality of terminal accommodating holes in one-to-one correspondence. The internal wire is wrapped inside the case body 120, and one end of the internal wire is electrically coupled to the communication terminal 140. Referring to FIG. 4, one end of the flexible data cable 160 is connected to the case body 120, and the other end of the internal wire is electrically coupled to the flexible data cable 160. The flexible connector 180 is connected to the other end of the flexible data cable 160, and the flexible connector 180 can be inserted in the opening and is connected to the communication interface portion.

Figure 5:
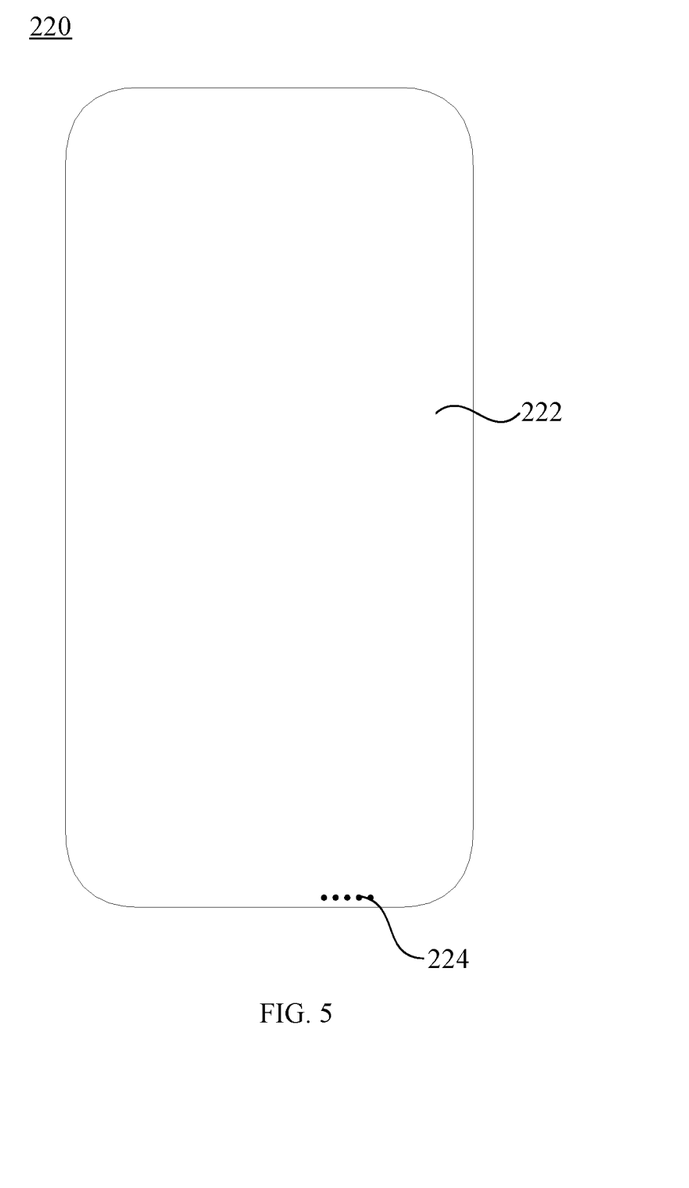
FIG. 5 is a front view of a mobile power supply of the mobile terminal peripheral assembly shown in FIG. 1.
Figure 6:
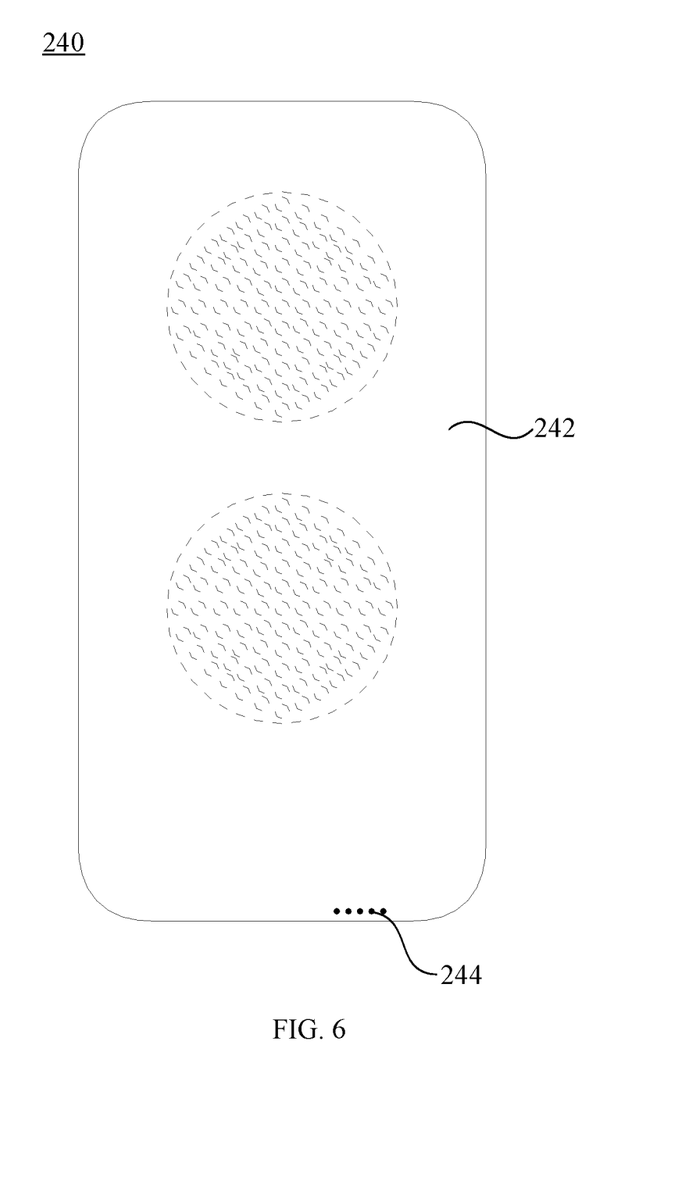
FIG. 6 is a front view of an audio device of the mobile terminal peripheral assembly shown in FIG. 1.
Figure 7:
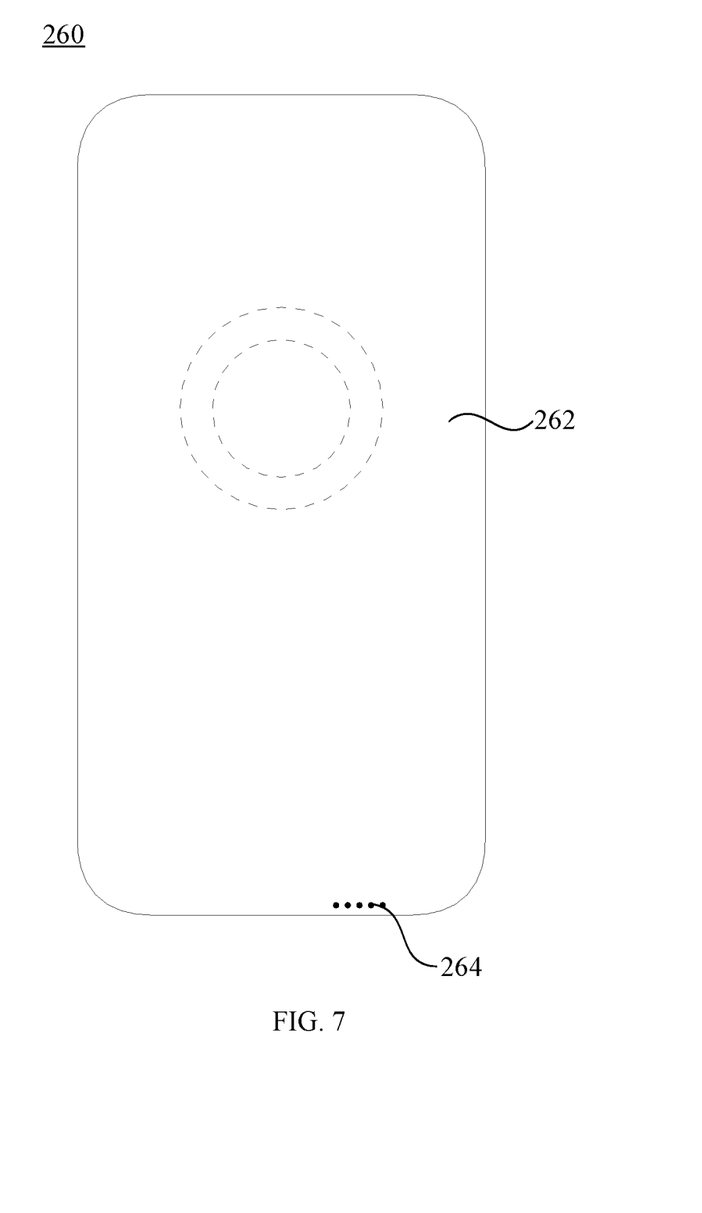
FIG. 7 is a front view of a projector of the mobile terminal peripheral assembly shown in FIG. 1.

Referring to FIGS. 5 to 7, the peripheral device 200 is a mobile power supply 220, an audio device 240, a projector 260, or a video camera, which can extend the sound effect function, the projection function, and the camera function of the mobile terminal accordingly. The peripheral device 200 includes a device body 222, 242, 262 and a plurality of docking terminals 224, 244, 264 disposed on the device body. The plurality of docking terminals 224, 244, 264 are electrically and communicatively coupled to the plurality of communication terminals 140 in one-to-one correspondence. The docking terminals 224, 244, 264 can be metal posts, one end of the docking terminals 224, 244, 264 are electrically coupled to the inside circuit of the device body 222, 242, 262, the other end of the docking terminals 224, 244, 264 can abut against the communication terminals 140, thereby realizing electrical coupling and communication between the peripheral device 200 and the mobile terminal.

The protective case 100 is sleeved on the mobile terminal. The flexible connector 180 is inserted in the communication interface portion of the mobile terminal, such that the communication terminal 140, the internal wire, the flexible data cable 160 and the flexible connector 180 can form a communication circuit. When it is required to connect the peripheral device 200, the communication terminal 140 is directly engaged to the docking terminals 224, 244, 264 of the peripheral devices 200, so that the communication between the peripheral device 200 and the mobile terminal can be realized, and the operation is convenient. Since the case body 120 surrounds the edge of the mobile terminal, it can protect the mobile terminal during collision or fall. The flexible connector 180 inserted in the communication interface portion can serve as a plugging member to prevent dust from entering the communication interface portion, thereby further protecting the mobile terminal Since the flexible data cable 160 and the flexible connector 180 are both flexible structures, they are not easily damaged after a long-term connection with the mobile terminal Meanwhile, since the whole structure of the protective case 100 is simple and light, the protective case 100 can be always sleeved on the mobile terminal to protect the mobile terminal without removing the protective case frequently. When it is required to connect the peripheral device, the protective case can be directly and conveniently connected.

Further, in one embodiment, the case body 120 can be an integral injection molding structure, which is convenient to process, and has a better structural strength and is not easily damaged. The material of the case body 120 can be plastic, silica gel, or the like. In order to improve the service life of the protective case 100, in one embodiment, the case body 120 can be a flexible structure. The flexible case body 120 cooperates with the flexible data cable 160 and the flexible connector 180, such that the whole structure is flexible. Even if it is sleeved on the mobile terminal for a long time, or is carried in a bag or a pocket, the protective case 100 is not easily damaged.

In one embodiment, the communication terminal 140 can be a metal post. One end of the metal post is used to abut against the docking terminals 224, 244, 264 of the peripheral devices, and the other end of the metal post is connected to the internal wire. The flexible connector 180 includes a flexible body and a metal sheet disposed inside and/or outside of the flexible body. The flexible data cable 160 includes a metal wire and a sheath wrapped around the metal wire. Both ends of the metal wire are respectively connected to the internal wire and the metal sheet, and both ends of the sheath are respectively connected to the case body and the flexible body.

In one embodiment, the case body 120 further includes a first snap-in portion and a second snap-in portion. The first snap-in portion is fixedly connected to one side of the case body 120, and used to engage a front surface of the mobile terminal. The second snap-in portion is fixedly connected to the other side of the case body 120, and the second snap-in portion is used to engage a rear surface of the mobile terminal. The first snap-in portion and the second snap-in portion are respectively located on the front and rear sides of the mobile terminal, thereby engaging the mobile terminal in the case body 120. Specifically, in one embodiment, the first snap-in portion and the second snap-in portion are both annular, and an annular groove is formed between the first snap-in portion and the second snap-in portion to engage the edge of the mobile terminal. In other embodiments, the case body 120 and the mobile terminal can be connected by other means, such as magnetic connection, adhesive connection, or the like.

In one embodiment, the case body 120 further includes a connection portion fixedly connected to the second snap-in portion. The connection portion can be detachably connected to the peripheral device 200, thus enabling a more secure connection between the peripheral device 200 and the protective case 100, and facilitating alignment between the communication terminals 140 and the docking terminals 224, 244, 264, thereby ensuring the reliability of the communication between the mobile terminal and the peripheral device 200.

The various technical features of the above-described embodiments can be arbitrarily combined, and for the sake of brevity, all possible combinations of the various technical features in the above-described embodiments are not described. However, as long as there is no contradiction in the combination of these technical features, it should be deemed to be within the scope of this specification.

The above-described embodiments represent only several embodiments of the disclosure. The description of the embodiments is more specific and detailed, but are not therefore to be construed as limiting the scope of the disclosure patent. It should be noted that several modifications and improvements can be made to those of ordinary skill in the art without departing from the inventive concept, all of the modifications and improvements fall within the scope of the disclosure. Therefore, the scope of protection of the disclosure patent shall be subject to the appended claims.

What is claimed is:

1. A protective case for protecting a mobile terminal and connecting a peripheral device, the protective case comprising:
    a case body capable of surrounding an edge of the mobile terminal, the case body having an opening and a plurality of terminal accommodating holes, the opening corresponding to a communication interface portion of the mobile terminal;
    a plurality of communication terminals configured to be communicated with the peripheral device, each communication terminal being embedded in a corresponding terminal accommodating hole;
    an internal wire disposed inside the case body, one end of the internal wire being electrically coupled to the communication terminal;
    a flexible data cable, one end of the flexible data cable being connected to the case body, and the other end of the internal wire being electrically coupled to the flexible data cable;
    a flexible connector connected to the other end of the flexible data cable, the flexible connector being capable of being inserted in the opening and connected to the communication interface portion; and
    wherein the case body is a flexible structure, the communication terminal being a metal post, one end of the metal post being configured to abut against the docking terminal of the peripheral device, the other end of the metal post being connected to the internal wire; and
    the flexible connector comprising a flexible body and a metal sheet disposed inside and/or outside of the flexible body, the flexible data cable comprising a metal wire and a sheath wrapped around the metal wire, both ends of the metal wire being respectively connected to the internal wire and the metal sheet, and both ends of the sheath being respectively connected to the case body and the flexible body.

2. The protective case of claim 1, wherein the case body is box-shaped and comprises a first frame bar, a second frame bar, a third frame bar, and a fourth frame bar which being connected end to end, the first frame bar being opposite to the third frame bar, the second frame bar being opposite to the fourth frame bar.

3. The protective case of claim 2, wherein the opening and the plurality of terminal accommodating holes are located on the first frame bar, the second frame bar and/or the fourth frame bar are provided with a pressing key mating with a function key of the mobile terminal.

4. The protective case of claim 2, wherein the case body further comprises:
    a first snap-in portion fixedly connected to one side of the case body, the first snap-in portion being configured to engage a front surface of the mobile terminal; and
    a second snap-in portion fixedly connected to the other side of the case body, the second snap-in portion being configured to engage a rear surface of the mobile terminal.

5. The protective case of claim 4, wherein the case body further comprises a connection portion fixedly connected to the second snap-in portion, the connection portion being detachably connected to the peripheral device.

6. The protective case of claim 4, wherein the first snap-in portion and the second snap-in portion are both annular, and an annular groove being formed between the first snap-in portion and the second snap-in portion to engage the edge of the mobile terminal.

7. The protective case of claim 4, wherein the case body is an integral injection molding structure.

8. A mobile terminal peripheral assembly for mounting on a mobile terminal, the mobile terminal peripheral assembly comprising:
    a protective case of claim 1, and
    a peripheral device comprising a device body and a plurality of docking terminals disposed on the device body, the plurality of docking terminals being electrically and communicatively coupled to the plurality of communication terminals in one-to-one correspondence.

9. The mobile terminal peripheral assembly of claim 8, wherein the peripheral device is a mobile power supply, an audio device, a projector or a video camera.

10. The mobile terminal peripheral assembly of claim 8, wherein the case body is box-shaped, the case body comprising a first frame bar, a second frame bar, a third frame bar, and a fourth frame bar which being connected end to end, the first frame bar being opposite to the third frame bar, the second frame bar being opposite to the fourth frame bar.

11. The mobile terminal peripheral assembly of claim 10, wherein the opening and the plurality of terminal accommodating holes are located on the first frame bar, the second frame bar and/or the fourth frame bar are provided with a pressing key mating with a function key of the mobile terminal.

12. The mobile terminal peripheral assembly of claim 10, wherein the case body further comprises a first snap-in portion and a second snap-in portion;
    the first snap-in portion fixedly connected to one side of the case body, the first snap-in portion being configured to engage a front surface of the mobile terminal; and the second snap-in portion fixedly connected to the other side of the case body, the second snap-in portion being configured to engage a rear surface of the mobile terminal.

13. The mobile terminal peripheral assembly of claim 12, wherein the case body further comprises a connection portion fixedly connected to the second snap-in portion, the connection portion being detachably connected to the peripheral device.

14. The mobile terminal peripheral assembly of claim 12, wherein the first snap-in portion and the second snap-in portion are both annular, and an annular groove being formed between the first snap-in portion and the second snap-in portion to engage the edge of the mobile terminal.

15. The mobile terminal peripheral assembly of claim 12, wherein the case body is an integral injection molding structure.

* * * * *